United States Patent [19]
McGinnis

[11] 3,773,167
[45] Nov. 20, 1973

[54] CONVEYOR BELT MULTIPLE DRIVE SYSTEM

[75] Inventor: Hebert E. McGinnis, Akron, Ohio

[73] Assignee: The B. F. Goodrich Company, New York, N.Y.

[22] Filed: Aug. 16, 1971

[21] Appl. No.: 171,850

[52] U.S. Cl. .............................. 198/203, 198/184
[51] Int. Cl. ............................................ B65g 23/10
[58] Field of Search .................... 198/184, 203, 193

[56] References Cited
UNITED STATES PATENTS

| | | | |
|---|---|---|---|
| 2,759,596 | 8/1956 | Keller | 198/203 X |
| 3,335,843 | 8/1967 | Duvivier | 198/193 |
| 2,304,419 | 12/1942 | Pratt | 198/203 |
| 2,735,537 | 2/1956 | Keller | 198/203 |

Primary Examiner—Edward A. Sroka
Attorney—William A. Shira, Jr. et al.

[57] ABSTRACT

A troughed conveyor belt of the type having nearly inextensible longitudinal reinforcements in its flat margins is used for long uninterrupted transport of bulk material, or for high lifts, by providing multiple drives along its length. Each of the multiple drives engages both the load-carrying strand and the return strand of the belt by means of a pair of driven tires between the marginal portions of the two belt strands and other pairs of tires pressing the belt against the driven tires. To assure proper division of work among the individual drive motors, they are identical in operating characteristics, and are selected to have a percentage of reduction in speed as the load is increased from no load to full load at least several times as great as the percentage of stretch in the longitudinal reinforcements of the belts.

18 Claims, 3 Drawing Figures

CONVEYOR BELT MULTIPLE DRIVE SYSTEM

CROSS-REFERENCE TO RELATED APPLICATION

This invention relates to a drive system for conveyor belts and is particularly useful for the type of marginally reinforced conveyor belt described and claimed in my co-pending application for patent, Ser. No. 106,158, filed Jan. 13, 1971, now U.S. Pat. No. 3,679,044 dated July 25, 1972.

BACKGROUND OF THE INVENTION

It has been well known for a great many years that a major limitation in use of conveyor belts for transport of bulk material is that the tension required to overcome friction increases with length, so that very long belts not only involve a cost for supporting structures approximately proportional to length, but also require a belt with a longitudinal strength proportional to length, with the result that the cost of the belt may be nearly proportional to the square of the length. Similar limitations apply to belts which lift or lower the load over a substantial height. In addition to cost, belts of great strength have the drawback of being stiff and difficult to train over the supporting structures and end pulleys.

Proposals have been made repeatedly that the driving force be applied to conveyor belts at a plurality of locations along their length, so that the tension will be only that required to move the belt and its load from one driving point to the next, and so that a belt of moderate strength can be used over a very long distance or over a very great height. Practical experience with such belt systems has been that under conditions of uneven load, such as inevitably occur at commencement and termination of a period of operation, and also under conditions of uneven slope, as when one part of a belt runs uphill and another part downhill, the stretch which occurs in the portion of a belt engaged by one driving unit but not in the portion engaged by another driving unit causes erratic and unpredictable surges of work load.

The consequence has been such undesirable or destructive effects as overloading and damage to individual motors, or interruption of operation through opening of circuit breakers, even though the total work load is not abnormal. Even worse, the differential driving resulting from stretch of the belt can cause appearance of slack in the portion of a belt between successive drive units, so that the belt is forced out of its intended path, spilling its load, and damaging the belt itself.

Because of unfortunate experiences of one kind or another, recent proposals for multiple drives have generally included elaborate speed controls or cross-connections intended to assure smooth operation and proper division of the work load among the several drive units. Such complications of design neutralize much of the savings otherwise attainable, in addition to introducing new factors which can cause unanticipated problems, and have not been accepted as a solution to the problem.

SUMMARY OF THE INVENTION

In this invention, a belt conveyor is driven by frictional engagement with a plurality of tires at spaced locations along its length, and preferably with each tire engaging both the load-carrying strand of the belt and also the return strand, so that driving force is applied at exactly the same speed in both directions at each driving point. For this purpose a particular relationship should be maintained between the extensibility of the belt and the "slip," or reduction in speed of the motor at each driving point as the work load on the motor is increased. This relationship is that the "slip" from no-load speed to the speed at the full designed load of the motor should be a percentage which is at least several times the percentage of extensibility of the belt from its relaxed condition to the condition of allowable safe tension. It is preferred that the percentage of slip in the drive motors be in the neighborhood of 10 times the percentage of extensibility of the belt, based on its relaxed length.

The belt itself is preferably one having longitudinal reinforcement in the form of a pair or pairs of steel cables located only in the margins of the belt, so that the driving force can be applied to the parts of the belt containing the longitudinal reinforcement, without interfering with the transport of the load in the troughed center of the belt. It is also preferred to have a pair of driven tires on one axis simultaneously engaging the bottom of the margins of the load-carrying strand of the belt and the tops of the margins of the return strand, and with additional tires on two other axes pressing the margins against the driven tires to avoid slippage.

THE DRAWINGS

In the accompanying drawings.

DETAILED DESCRIPTION

Figure 1:
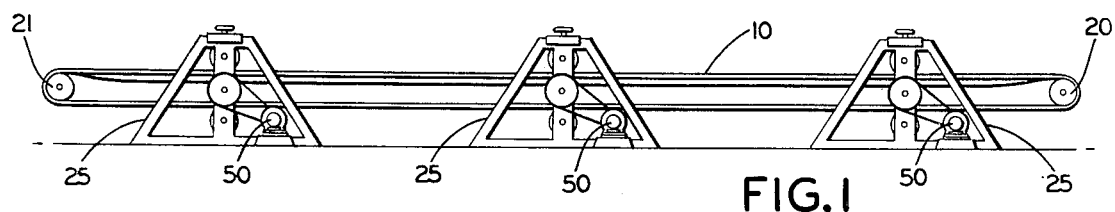
FIG. 1 is a schematic view of a troughed conveyor belt driven by a plurality of identical drive units spaced along its length.
Figure 2:
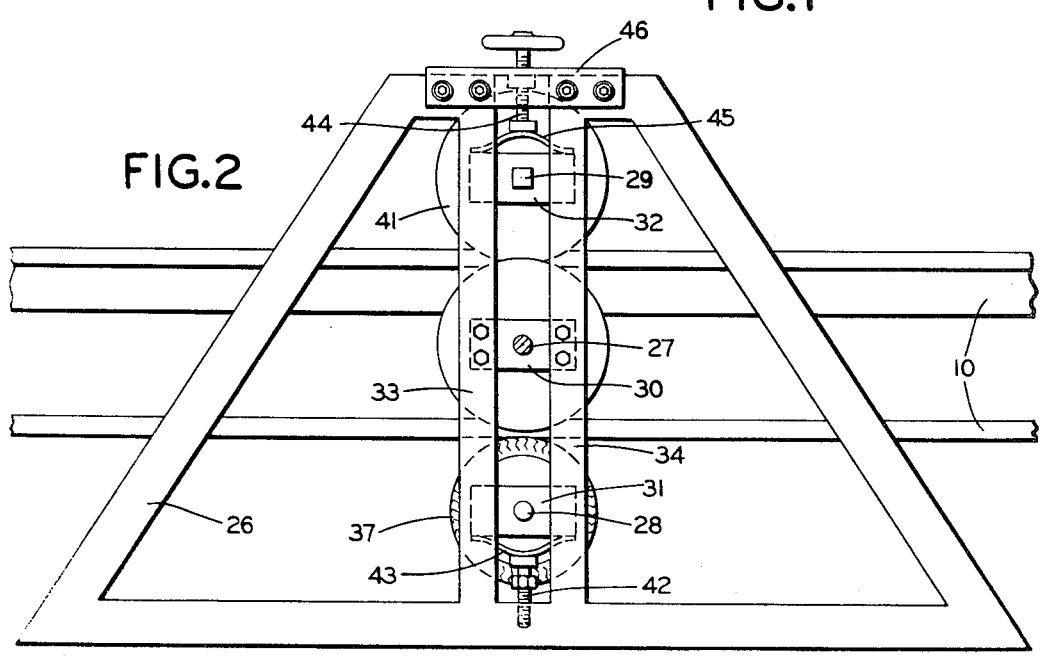
FIG. 2 is a side view of an individual drive unit viewed from the Line 2—2 of FIG. 3.

The drive system of this invention is preferably used with a flat belt 10 of rubber or similar elastomeric material having its longitudinal reinforcement in the form of steel cables 11 located in thickened margins 12, and having transverse reinforcements connecting the margins for support of the load 13 of bulk material in the troughed center 14 of the belt.

The belt 10 passes over the usual head pulley 20 and tail pulley 21. The conventional supports and tensioning devices for the head and tail pulleys, as well as the usual troughing rolls, and flat idler rolls for support of the return strand of the belt, are not shown. A plurality of identical drive units 25 are spaced along the length of the belt 10.

Each drive unit contains a frame 26 for supporting journals for a central driven axle 27, and for guiding a lower non-driven axle 28 and upper non-driven axle 29. The journal 30 for the driven axle 27 is fixed in the frame, while the support 31 for the lower non-driven axle 28 and the support 32 for the upper non-driven axle 29 are vertically slideable in facing vertical channel members 33 and 34. Fixed on driven axle 27 is a pair of tires 35 having essentially flat treads, preferably provided with transversely ribbed or serrated surfaces of the kind known to provide firm frictional engagement with the margins 12 of the belt 10 without exerting any lateral force on it, such as the laterally extending zigzag ribs shown in FIG. 3.

The tires should be made of material having a high coefficient of friction and resistance to wear, such as the rubber or similar elastomeric materials used in making vehicle tires. They should be radially resilient enough to accommodate normal differences in thickness of different portions of the length of the belt, as well as possible bits of the load carried by the belt, and for this purpose they may be pneumatic tires, but can also be made as stout casings with a permanent filler, such as resilient foam material, or even solid elastomer if of sufficient thickness to impart a substantial resilience. Presently preferred are flat tread tires with an essentially inextensible peripheral belt under the tread, which are made for use as pneumatic tires, but which are filled with a pressurized foam of elastomer so as to eliminate the need for periodic adjustment of inflation pressures.

Moreover, since the tires 35 have a driving engagement with both the load-carrying strand and the return strand of the belt 10, it is desirable that the treads of the tires have sufficient circumferential flexibility to permit rolling engagement without slippage with both the upper and the lower strand of the belt, even though one may be under little tension and the other under very high tension. The yielding of the serrations in the tire treads is generally amply sufficient for this, if the longitudinal reinforcement of the belt is such as to limit stretch to a fraction of 1 per cent.

Since the troughing of the belt 10 for containment of its load 13 draws the margins 12 somewhat closer together in the load-carrying upper strand of the belt than in the flat return strand, the tires 35 are made wide enough to engage the margins 12 of the belt 10 over their entire width in both the upper and the lower strand of the belt. Preferably there is located next to each tire 35 on the side facing away from the belt, a flange 36, which is simply a metal disc serving as a guide to prevent the lower strand of the belt 10 from wandering into a position in which it might rub against the frame 26.

The lower non-driven axle 28 has journaled on it, a pair of tires 37 and a central drum 38. The tires 37 are essentially the same as the driven tires 35, except that they need be only as wide as the margins 12 containing the reinforcing cables 11. The drum 38 is of the same diameter as the treads of the lower tires 37, and serves to support the center of the return strand of the belt against sagging. The upper non-driven axle 29 may have an upwardly bent bow 39 in its center to assure clearance of the load 13 on the belt. On either side of the bow 39, the upper axle 29 has on it a pair of non-driven tires 40 identical with the lower non-driven tires 37. Preferably, flanges 41 are provided on the outer side of each of the upper tires 40, as guides for the load-carrying strand of the belt.

The support 31 for the lower axle 28 rests on an adjusting screw 42, the thrust of which is resiliently transmitted by a spring 43. Similarly, the support 32 for the upper axle 29 is pressed downwardly by an adjusting screw 44 through a spring 45. Removal of the axles 27, 28, and 29 is provided for by a bolted-on cap 46, joining the upper ends of the vertical channels 33 and 34.

Figure 3:
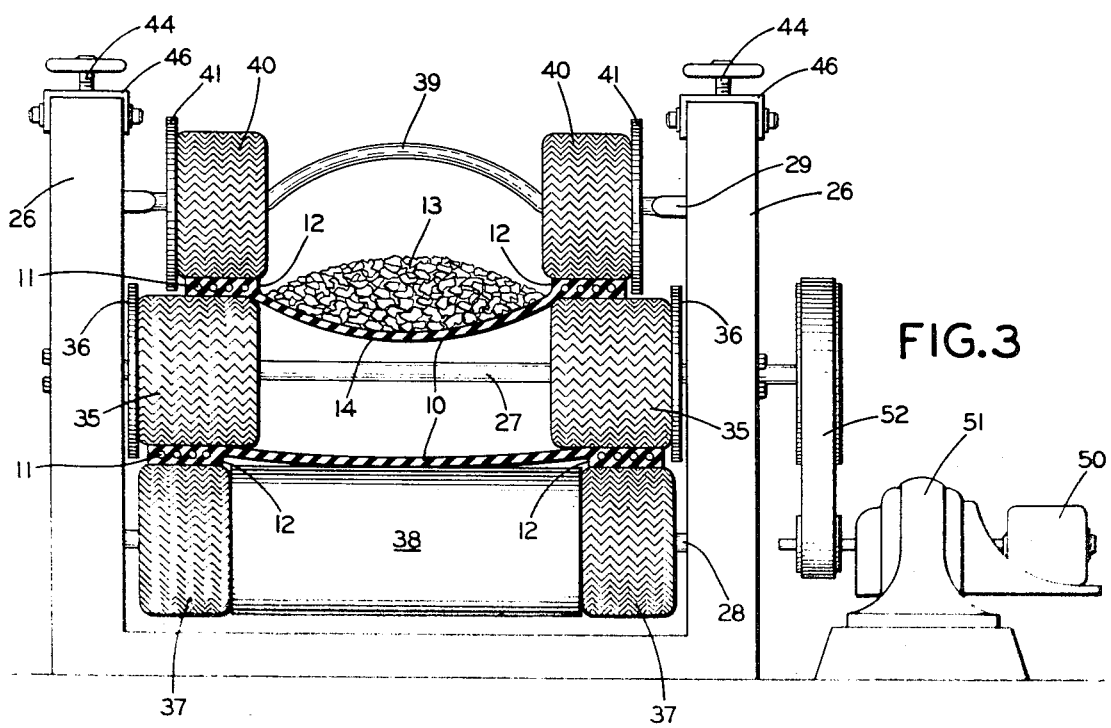
FIG. 3 is a longitudinal view of an individual drive unit.

The driven axle 27 is connected to a driving motor 50, preferably by some suitable positive drive connection, such as the speed-reducing gear box 51 and silent chain drive 52 shown in FIG. 3. The driving arrangement should be one which inherently drives at a somewhat reduced speed as the work load increases. If electric motor drives are used, this can be accomplished by employing suitable designed shunt wound motors operating on direct current, or squirrel cage induction motors operating on three-phase alternating current.

When the belt 10 is longitudinally reinforced by steel cables 11 having an extensibility of about ¼ percent at allowable tension values, standard squirrel cage induction motors having a slip from no load to full load in the range of 3 percent to 5 percent are generally suitable, although for some purposes medium slip, high starting torque motors with a slip value of 7 percent to 12 percent might be more desirable. This represents a ratio of motor slip to belt extensibility in the range of 12 to 20 in the one case, and 28 to 48 in the other.

In operation of this multiple drive belt system, all of the several motors should ordinarily be put in operation simultaneously and be shut off simultaneously, to avoid overloading any one of the motors or imposing excessive tension on any part of the belt. This is easily accomplished with standard motor starting equipment.

Because of the extremely low extensibility of the steel cables 11 which constitute the longitudinal reinforcement, it is not possible for any significant stretch in any portion of the belt to appear and to cause a troublesome slack condition elsewhere in the belt. Instead, whenever a substantial localized load anywhere in the belt reduces its speed, or retards its acceleration, sufficiently to impose additional work on any one of the motors, the speed of the entire belt, and therefore the speed of all the identical driving motors, will be similarly reduced, and the work load will be shared approximately equally among all of the motors. Since the drive units engage both the load-carrying strand and return strand of the belt, even a heavy load near the discharge end will cause no problem, as the several drive units will share the work by pulling equally on the return strand of the belt.

Although it is presently preferred to apply the driving force to a pair of tires which simultaneously engage both strands of a conveyor belt, it will sometimes be sufficient to have the driving force applied only to the load-carrying strand. Moreover, it may sometimes be found convenient to drive the lower pair or the upper pair of tires in a drive unit containing three superimposed pairs of tires, with the intermediate pair being fictionally driven by the motion of the belt itself.

Under particularly severe conditions of work load resulting from very long lengths or very great differences in height, positive drive to all six of the tires may prove to be desirable, or possibly even placement of a cluster of pairs of tires in close succession along the belt with all of the intermediate level of tires, or all tires in all levels of the cluster, being connected to one driving motor for transmission of the driving force by several pairs, or by all of the tires simultaneously.

The conveyor belt system of this invention appears to have eliminated for the first time, in a particularly simple and practical manner, the problem of operating belt conveyors over very long distances and over very great heights.

I claim:

1. A drive unit for transmitting motion to a conveyor belt, comprising a first pair of tires for engaging the margins only of the belt between the upper strand and the lower strand of the belt, a second pair of tires above the belt pressing the upper strand of the belt against the first pair, a third pair of tires pressing the lower strand of the belt against the first pair, and a motor driving at least one pair of the tires.

2. A drive unit as in claim 1, including means for adjusting the pressure of the other tires toward the driven tires.

3. A drive unit as in claim 1, in which the first pair of tires are the driven tires.

4. A drive unit as in claim 3, in which the tires have a serrated tread on a flexible carcass.

5. A drive unit as in claim 4, in which the tires are distended by internal pressure.

6. A drive unit as in claim 5, in which the tires while under no external load have an essentially cylindrical tread.

7. A drive unit as in claim 6, in which the tires have a tread which will transmit circumferential driving forces free from lateral components.

8. A drive unit as in claim 1, in which the driven tires are actuated by a motor having a substantial slip when operating under load.

9. The combination of a drive unit as in claim 1 and a conveyor belt with its margins only gripped between the driven tires and the other tires.

10. The combination as in claim 9, in which the belt has its longitudinal reinforcements essentially in its margins.

11. The combination as in claim 10, in which the longitudinal reinforcements of the belt are nearly inextensible.

12. The combination of claim 9, in which there are multiple drive units on a single belt.

13. The combination as in claim 11, in which there are multiple drive units on a single belt.

14. The combination as in claim 13, in which a pair of tires presses the margins of the upper strand of the belt against the driven tires and another pair of tires presses the margins of the lower strand of the belt against the driven tires.

15. The combination as in claim 14, in which the drive units are identical in operating characteristics.

16. The combination as in claim 15, in which the drive units include motors having a percentage of slip at full allowable work load at least several times the percentage of extensibility of the belt at full allowable tension load.

17. The combination of
a conveyor belt having nearly inextensible longitudinal reinforcements located essentially only in its margins, with
a plurality of similar drive units, each drive unit including
at least two pairs of resilient tires pressing against the belt margins, one pair from above and the other pair from below, and
a motor, having a percentage of slip at full allowable work load which is at least several times the percentage of extensibility of the belt at full allowable tension load, driving at least one pair of tires.

18. The combination of claim 17 including another pair of resilient tires pressing the margins of the return strand of the belt against the driven tires.

* * * * *